United States Patent
Tillotson et al.

[11] Patent Number: 6,159,271
[45] Date of Patent: Dec. 12, 2000

[54] METHOD AND SYSTEM FOR ORIENTING DIAMAGNETIC LIQUID WITH RESPECT TO A GAS IN A LOW GRAVITY ENVIRONMENT

[75] Inventors: Brian J. Tillotson, Kent, Wash.; Janice D. Houston, Huntsville, Ala.

[73] Assignee: The Boeing Company, Seattle, Wash.

[21] Appl. No.: 09/151,858

[22] Filed: Sep. 11, 1998

[51] Int. Cl.$^7$ .................................................. B03C 1/02
[52] U.S. Cl. ............................. 95/28; 95/241; 95/260; 96/1; 96/155; 96/204; 210/222; 210/695
[58] Field of Search ....................... 95/28, 241, 260; 96/1–3, 155, 204; 55/DIG. 6; 210/222, 223, 695

[56] References Cited

U.S. PATENT DOCUMENTS

| | | | |
|---|---|---|---|
| 1,056,043 | 3/1913 | Morrison | 210/695 |
| 2,637,408 | 5/1953 | Yadoff | 95/28 |
| 3,483,968 | 12/1969 | Kaiser | 209/172.5 X |
| 3,597,022 | 8/1971 | Waldron | 308/10 |
| 3,973,926 | 8/1976 | Levi | 96/2 X |
| 4,049,398 | 9/1977 | Vaseen | 95/28 |
| 4,170,447 | 10/1979 | Goldstein et al. | 95/28 X |
| 4,217,213 | 8/1980 | Schuster | 95/28 X |
| 4,283,204 | 8/1981 | Savage | 96/2 X |
| 4,476,105 | 10/1984 | Greenbaum | 95/28 X |
| 4,508,625 | 4/1985 | Graham | 210/695 |
| 4,816,143 | 3/1989 | Vollmar | 95/28 X |
| 4,828,711 | 5/1989 | Cohen | 95/28 X |
| 4,902,428 | 2/1990 | Cohen | 96/2 X |
| 5,106,592 | 4/1992 | Stapelmann et al. | 422/100 X |
| 5,238,547 | 8/1993 | Tsubouchi et al. | 96/3 |
| 5,866,010 | 2/1999 | Bogatin et al. | 210/695 |

FOREIGN PATENT DOCUMENTS

| | | | |
|---|---|---|---|
| 374942 | 6/1990 | European Pat. Off. | 95/28 |
| 1910574 | 9/1970 | Germany | 96/1 |
| 1360769 | 12/1987 | U.S.S.R. | 95/28 |

OTHER PUBLICATIONS

M. Marinelli et al., "Diamagnetism of Powder and Bulk Superconducting YBCO Measured With a New Magnetic Levitometer," Elsevier Science Publishers B.V., Amsterdam, The Netherlands, 1989, pp. 149–158.

*Primary Examiner*—Richard L. Chiesa
*Attorney, Agent, or Firm*—Christenson O'Connor Johnson Kindness PLLC

[57] ABSTRACT

A method and system for orienting diamagnetic liquids in a container in a low gravity environment includes at least one magnet. The magnet or magnets are placed at the end of the container opposite a desired location for the diamagnetic liquid. The magnetic field generated by the magnet creates a diamagnetic force that repels the diamagnetic liquid away from the magnet and toward the desired location.

7 Claims, 2 Drawing Sheets

METHOD AND SYSTEM FOR ORIENTING DIAMAGNETIC LIQUID WITH RESPECT TO A GAS IN A LOW GRAVITY ENVIRONMENT

FIELD OF THE INVENTION

The present invention relates generally to methods for manipulating the movement of a liquid and, more particularly, to magnetic methods for orienting a liquid phase with respect to a gaseous phase in a low gravity environment.

BACKGROUND OF THE INVENTION

Systems that use liquids face the problem of separating gas or vapor from the liquid, or more particularly, of collecting the liquid at a specified location and collecting the gas or vapor at another specified location. Examples include fuel lines, coolant loops, hypodermic syringes, and materials processing. For most such systems operating on Earth, the dense liquid is easily separated from the less dense gas and collected at a preferred location by the force of gravity, provided that the system is properly oriented with respect to the gravity vector. However, for such systems operating in a low gravity environment, such as in orbiting spacecraft, the liquid is not necessarily aggregated at a known location in the tank. Instead, the liquid and gas mix freely throughout the volume of its container or conduit. Therefore, a need for orienting liquid with respect to a gas or vapor in a low gravity environment arises.

One method for effecting gas-liquid orientation in an orbiting spacecraft involves firing attitude thrusters to produce acceleration along a preferred axis. This method has drawbacks. In addition to increasing the operational complexity of a space mission, firing attitude thrusters also requires consumption of attitude propellant, a strictly limited resource.

Another method uses an elastic bladder to confine the liquid at one end of a rigid tank, with liquid on one side of an elastic membrane and gas or vapor on the other side. Use of an elastic bladder poses significant problems and concerns. First of all, leakage in the bladder may cause system failure. Secondly, the mass of the bladder and its mounting apparatus reduces the performance level of the system. Thirdly, the bladder must often contain costly materials that can maintain elasticity even after prolonged contact with the liquid, which may be corrosive. Fourthly, extensive testing on the materials is often required. Fifthly, the bladder cannot remove a gas or vapor bubble which forms inside the bladder.

Another method uses centripetal force from a rotating device to move the dense liquid radially outward and the less dense gas radially inward. Use of a centrifigal system poses significant concerns. The system requires one or more motors which consume power and generate vibration and noise. The system contains moving parts which present a risk of mechanical failure.

Another method uses a liquid acquisition device with a finely channeled surface made of a wettable material. The liquid acquisition device connects the interior of the container with an outlet port. This method is often used in rocket propellant tanks. It is based on the theory that capillary action will accumulate a sufficient amount of propellant at the outlet port to start the system, after which the rocket's acceleration will maintain the position of the liquid propellant at the outlet port. This method presents some concerns. This method sometimes fails for reasons that are poorly understood. In addition, the liquid acquisition device is complex to fabricate and adds substantial mass to the system.

Yet another method uses a magnet to attract a paramagnetic liquid, thereby moving the liquid to a desired location near the magnet and separating the liquid from a gas or vapor that is magnetically repelled or less strongly attracted. This method is only effective when used with paramagnetic liquids. However, the great majority of liquids are diamagnetic, not paramagnetic.

Accordingly, it is an object of this invention to provide a method and system for orienting diamagnetic liquids with respect to gas or vapor in a low gravity environment.

It is another object of this invention to provide a method and system for orienting diamagnetic liquids with respect to gas or vapor in a low gravity environment that is simple and inexpensive.

It is another object of this invention to provide a method and system for orienting diamagnetic liquids with respect to gas or vapor in a low gravity environment that is low in weight.

It is yet another object of this invention to provide a method and system for orienting diamagnetic liquids with respect to gas or vapor in a low gravity environment that does not leak.

It is yet another object of this invention to provide a method and system for orienting diamagnetic liquids with respect to gas or vapor in a low gravity environment that has low power consumption and has no moving parts.

It is yet another object of this invention to provide a method and system for orienting diamagnetic liquids with respect to gas or vapor in a low gravity environment that is reliable.

SUMMARY OF THE INVENTION

The present invention is a method and system for orienting diamagnetic liquids with respect to vapor or gas in a low gravity environment. Non-superconducting materials can exhibit several forms of magnetic behavior, including ferromagnetism, paramagnetism, and diamagnetism. Although all substances exhibit a diamagnetic component in their total magnetic behavior, the repulsive diamagnetic force is relatively weak. The diamagnetic force is dominated by the attractive forces of ferromagnetism or paramagnetism, if either is present. Although a few extraordinarily powerful magnets are sufficiently strong to levitate small diamagnetic objects in Earth's gravity, the diamagnetic force is normally dominated by Earth's gravitational force.

However, in a low gravity environment, such as in orbiting spacecraft, the diamagnetic force can sometimes be stronger than the residual gravity. A system for orienting liquids with respect to a gas in a low gravity environment includes at least one magnet. The magnet may be a permanent magnet, an electromagnet, or a superconducting flux-trapping magnet. To orient a liquid that is diamagnetic, such as hydrazine or water, the magnet or magnets are placed at the end of a container holding the liquid, opposite the desired location of the liquid. The magnetic field generated by the magnet creates a diamagnetic force that repels the liquid away from the magnet and toward the desired location, such as an outlet port of the container. The liquid displaces the gas or vapor which therefore moves toward the magnet.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
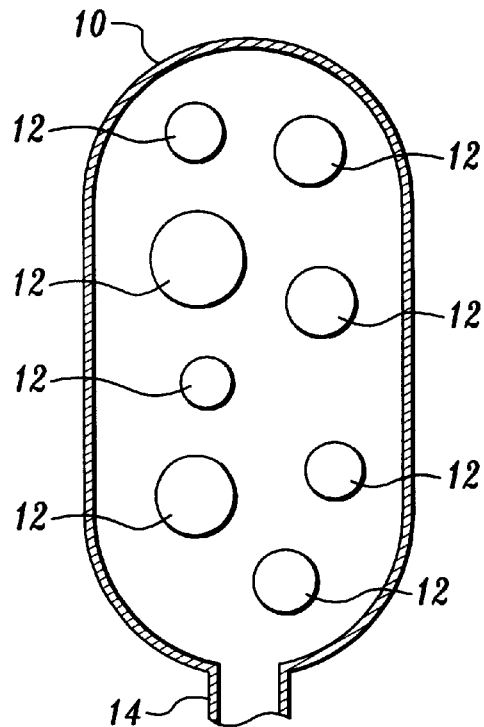
FIG. 1 is a schematic diagram of a cross section of a container containing a liquid and vapor or gas in a low gravity environment.

Referring to FIG. 1, a container 10 contains a liquid 12 in a low gravity environment. The liquid 12 does not necessarily aggregate in a predictable shape or location because of the lack of or little gravitational force. Therefore, the liquid 12 may be dispersed in globules throughout the container 10, leaving voids throughout the rest of the container 10. Thus, the liquid may not be collected at a desired location, such as an outlet port 14 of the container 10.

Figure 2:
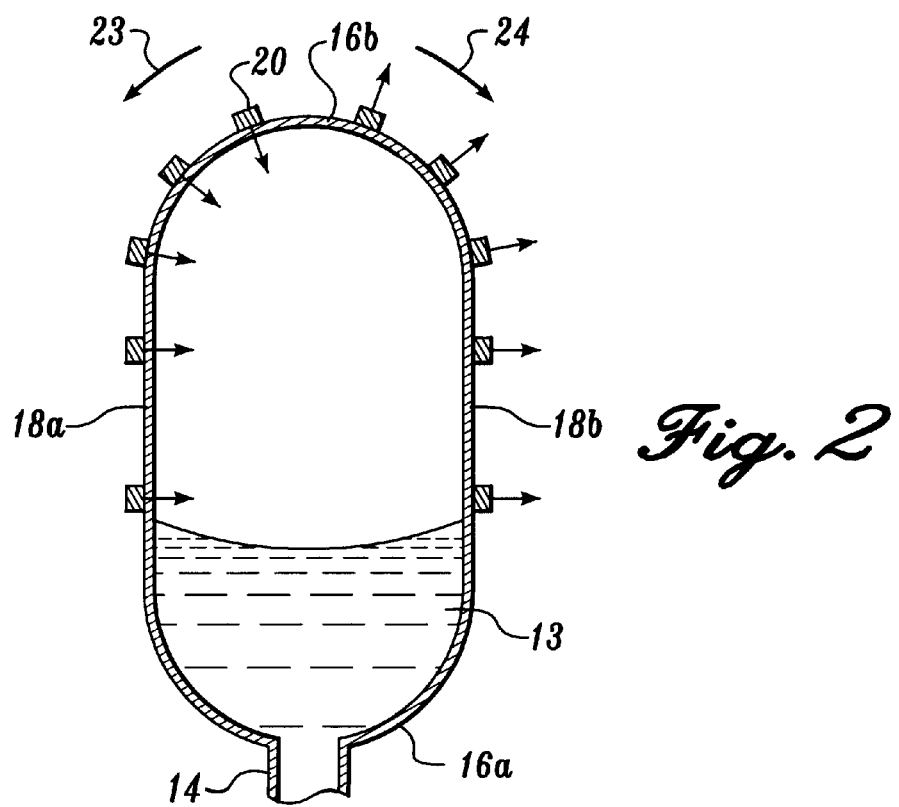
FIG. 2 is a schematic diagram of a cross section of a preferred embodiment of a system for orienting a diamagnetic liquid with respect to a vapor or gas, with both the liquid and vapor or gas contained in a container in a low gravity environment; the container having a desired location, such as an outlet port.

Referring to FIG. 2, a preferred embodiment of a system for orienting a diamagnetic liquid 13 in the container 10 in a low gravity environment is schematically illustrated. The container 10 is cylindrical and has two hemispherical ends 16a and 16b. The outlet port 14 for dispensing the liquid 13 is located at one of the hemispherical ends 16a and is located on the longitudinal axis of the container 10 equidistant from a left wall 18a and a right wall 18b of the container 10.

In one embodiment, the system includes at least one magnet 20 that is positioned at the hemispherical end 16b opposite of the outlet port 14. The magnet 20 interacts with the diamagnetic liquid 13, creating a diamagnetic force that repels the liquid 13 toward the outlet port 14. However, if the container 10 is nearly empty and is large compared to the magnet 20, the remaining liquid 13 may be easily perturbed from the outlet port 14 because the force from the distant magnet 20 may be too weak to overcome any disturbances.

Therefore, in the preferred embodiment, a plurality of magnets 20 is used. The magnets are homogeneous in strength and type and are arranged in two rows, with a left row 23 along the left wall 18a of the container 10 and a right row 24 along the right wall 18b of the container 10. Starting at the hemispherical end 16b opposite of the outlet port 14 and moving toward the outlet port 14, the spacing between two adjacent magnets successively increases. That is, the closer each magnet 20 is to the outlet port 14, the farther it is from its adjacent magnets 20 and the weaker is the average magnetic field between the left row 23 and the right row 24 of magnets. In this arrangement, the magnets 20 produce a fairly smooth magnetic gradient along the length of the container 10, causing the diamagnetic liquid 13 to be repelled toward the outlet port 14 regardless of the amount of liquid 13 remaining in the container 10. Alternatively, the magnets 20 in each row 23 and 24 can be equally spaced if the magnets 20 used are not homogeneous, with the magnets 20 closer to the outlet port 14 being weaker than the magnets 20 farther from the outlet port 14.

Furthermore, the magnets 20 in the left row 23 are preferably pointed in the same direction as the magnets 20 in the right row 24. For example, the arrows shown on the magnets 20 indicate the direction of the north pole. This parallel orientation of the magnets 20 yields the maximum magnetic field inside the container 10, thereby making the most effective use of the magnets 20. Additionally, this orientation of the magnets 20 eliminates the potential of producing a net magnetic field strength of zero in any location in the container 10.

Figure 3:
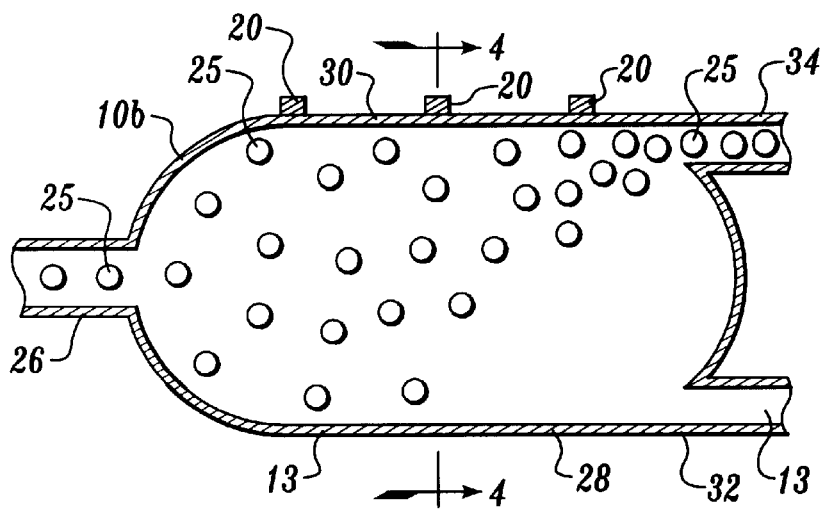
FIG. 3 is a schematic diagram of a cross section of another embodiment of a system for orienting a diamagnetic liquid with respect to a vapor or gas, with both the liquid and vapor or gas flowing through a container in a low gravity environment, the container having an outlet port for removing the liquid, another outlet port for removing the vapor or gas, and an inlet port for injecting a mixed stream of liquid and vapor or gas.

Referring to FIG. 3, another embodiment of a system for orienting a diamagnetic liquid in a container 10b in a low gravity environment is schematically illustrated. A mixed stream of liquid 13 and vapor or gas 25 enters the container 10b via an inlet port 26. Magnets 20 interact with the diamagnetic liquid, creating a force that repels the liquid 13 toward a preferred wall 28 of the container. As the liquid and vapor or gas move through the container, the liquid 13 is increasingly concentrated on the preferred wall 28 of the container and the vapor or gas 25 is increasingly concentrated on a wall 30 opposing the preferred wall 28. The liquid 13 exits the container 10b via an outlet port 32 positioned along the preferred wall 28 and opposite the inlet port 26, while the vapor or gas 25 exits via another outlet port 34 positioned along the opposing wall 30 and opposite the inlet port 26.

Figure 4:
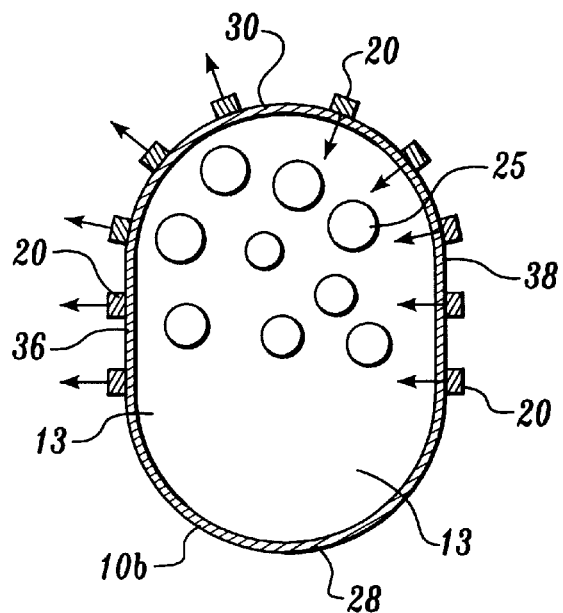
FIG. 4 is a schematic diagram of a cross section of the embodiment illustrated in FIG. 3, along the 4—4 line.

FIG. 4 illustrates the preferred arrangement of the magnets 20 used in the embodiment shown in FIG. 3. FIG. 4 is a schematic diagram of a cross section of the embodiment shown in FIG. 3, along the 4—4 line. The magnets are homogenous in strength and type and are arranged in rows along a left wall 36 and a right wall 38 of the container. FIG. 3 shows three pairs of rows of magnets. However, there may be one or more pairs of rows of magnets. Starting at wall 30 opposite the preferred wall, the spacing between adjacent magnets 20 in a row successively increases. That is, the closer the magnet is to the preferred wall 28, the farther it is from its adjacent magnets. In this arrangement, the magnets 20 produce a fairly smooth magnetic gradient across the width of the container, causing the diamagnetic liquid 13 to be repelled toward the preferred wall 28 regardless of the location or amount of liquid in the container 10b. Alternatively, the magnets in each row can be equally spaced if the magnets used are not homogenous, with the magnets closer to the preferred wall 28 being weaker than the magnets farther from the preferred wall 28.

Furthermore, the magnets along the left wall 36 are preferably pointed in the same direction as the magnets along the right wall 38. For example, the arrows shown on the magnets indicate the direction of the north pole. This parallel orientation of the magnets yields the maximum magnetic field inside the container 10b, thereby making the most effective use of the magnets. Additionally, this orientation of the magnets eliminates the potential of producing a net magnetic field strength of zero in any location in the container 10b.

The strength of the magnets, the number of magnets used, and the location of the magnets can be determined from the underlying principles in the following discussion. The force F on a magnetic dipole $\mu$ in a spatially varying magnetic field H is given by $$F = \mu\nabla(\mu_u \cdot \mu_0 H),$$

where boldface denotes a vector, $\mu$ is the magnitude of $\mu$, and $\mu_u$ is the unit vector in the direction of $\mu$. With diamagnetic or paramagnetic materials, the dipole is induced in the material by the magnetic field. Given a scalar volumetric susceptibility $\chi$, the induced dipole per unit volume M is given by $$M = \mu/V = \chi H,$$

where V is volume.

Therefore, the force per unit volume f on a diamagnetic material is given by $$f = F/V = \chi H \nabla(H_u \cdot \mu_0 H) = \chi \mu_0 H \nabla H$$

where H is the magnitude of H and $H_u$ is the unit vector in the direction of H. The potential energy per unit volume u of a material brought from a region with no magnetic field into a region with a magnetic field H is given by the integral of force per unit volume along the path s $$u = -\int f \cdot ds = -\int \chi\mu_0 H \nabla H \cdot ds = -\mu_0 \chi H^2/2.$$

In the presence of a gravitational field g and in the absence of a magnetic field, the potential energy per unit volume of a material with density $\rho$ is given by $$u = \rho g h.$$

If a magnetic field is also present, the potential energy per unit volume is given by $$u = \rho g h - \mu_0 \chi H^2/2.$$

The magnetic forces are stronger than the gravitational forces when $$|\mu_0 \chi H^2/2| > |\rho g h|.$$

For example, consider water, having a density of 1000 kg/m³ and a diamagnetic susceptibility $\chi$ of $-9\times10^{-6}$, and a good quality commercial magnet with a field of B=0.5 Tesla (i.e., $H=B/\mu_0=397887.4$ Oerstads). Substituting into the equation immediately above, 0.895 J/m³>1000 gh so h<0.895/1000 g.

Therefore, in an orbiting spacecraft where the residual gravity is one millionth of Earth's surface gravity (i.e. $g=9.82\times10^{-6}$ N/kg), a 0.5 Tesla field will exclude water with a pressure head of up to 91.2 meters.

While the preferred embodiment of the invention has been illustrated and described, it will be appreciated that various changes can be made therein without departing from the spirit and scope of the invention. For example, the size and shape of the container may vary. Instead of planar symmetry, embodiments may have axial symmetry or may be asymmetric. The container may have an outlet port as shown in the Figures or may be a sealed container. The type and strength of the magnets may also vary. For example, electromagnets may be used in lieu of permanent magnets. Furthermore, instead of using magnets, the appropriate sections of the container may be magnetized to create the necessary magnetic field. Pieces of ferromagnetic material may be used to channel magnetic flux, thereby maling more efficient use of the available magnetomotive force. The gas or vapor may be diamagnetic or paramagnetic. In addition this system applies to other diamagnetic liquids than water, such as liquid propellants.

The embodiments of the invention in which an exclusive property or privilege is claimed are defined as follows:

1. A system for orientating a diamagnetic liquid in a low gravity environment comprising:

a container having a desired location into which the diamagnetic liquid is to be urged; and a magnetic source positioned at or near a location opposite of the desired location, wherein the magnetic source comprises a plurality of homogenous magnets, the magnets being arranged in a first row and a second row, the first row of magnets being arranged along a first wall of the container and the second row of magnets being arranged along an opposite wall of the container, the first row and the second row being approximately symmetrical from the desired location, and the spacing between successive magnets in each row increasing as the magnets near the desired location.

2. A system for orientating a diamagnetic liquid in a low gravity environment comprising:

a container having a desired location into which the diamagnetic liquid is to be urged; and a magnetic source positioned at or near a location opposite of the desired location, wherein the magnetic source comprises a plurality of magnets, the magnets being arranged in a first row and a second row with the magnets in each row being equally spaced, the first row of magnets being arranged along a first wall of the container and the second row of magnets being arranged along an opposite wall of the container, the first row and the second row being approximately symmetrical from the desired location, and the strength of the successive magnets in each row decreasing as the magnets near the desired location.

3. A system for orienting diamagnetic liquid with respect to a vapor or gas in a low gravity environment, comprising:

a container having a preferred wall and an opposing wall opposite the preferred wall;

an inlet port, positioned between the preferred wall and the opposing wall, through which a mixed stream of diamagnetic liquid and vapor or gas enters the container;

a first outlet port positioned opposite of the inlet port and along the preferred wall, through which the diamagnetic liquid exits the container;

a second outlet port, positioned opposite of the inlet port and along the opposing wall through which the vapor or gas exits the container; and a magnetic source positioned at or near the opposing wall, wherein the magnetic source comprises a plurality of homogeneous magnets, the magnets being arranged in a first row and a second row, the first row of magnets being arranged along a first wall of the container between the preferred wall and the opposing wall and the second row of magnets being arranged along a wall opposite of the first wall of the container, the first row and the second row being approximately symmetrical from the preferred wall, and the spacing between successive magnets in each row increasing as the magnets near the preferred wall.

4. A system for orienting diamagnetic liquid with respect to a vapor or gas in a low gravity environment, comprising:
- a container having a preferred wall and an opposing wall opposite the preferred wall;
- an inlet port, positioned between the preferred wall and the opposing wall, through which a mixed stream of diamagnetic liquid and vapor or gas enters the container;
- a first outlet port, positioned opposite of the inlet port and along the preferred wall, through which the diamagnetic liquid exits the container;
- a second outlet port, positioned opposite of the inlet port and along the opposing wall, through which the vapor or gas exits the container; and
- a magnetic source positioned at or near the opposing wall, wherein the magnetic source comprises a plurality of magnets, the magnets being arranged in a first row and a second row with the magnets in each row being equally spaced, the first row of magnets being arranged along a first wall of the container between the preferred wall and the opposing wall and the second row of magnets being arranged along a wall opposite of the first wall of the container, the first row and the second row being approximately symmetrical from the preferred wall, and the strength of the successive magnets in each row decreasing as the magnets near the preferred wall.

5. A method for orienting a diamagnetic liquid with respect to a vapor or gas in a container in a low gravity environment such that the diamagnetic liquid moves into and remains in a desired location adjacent to a side of the container and remote from an opposite side of the container, which method comprises applying a first magnetic field at a first side of the container and applying a second magnetic field at a second side of the container opposite the first side, the first and second magnetic fields interacting with the diamagnetic liquid to produce a force that repels the diamagnetic liquid toward the desired location.

6. The method defined in claim 5, in which the first magnetic field is of a polarity opposite the polarity of the second magnetic field.

7. A method for orienting a diamagnetic liquid with respect to a vapor or gas in a container in a low gravity environment such that the diamagnetic liquid moves into and remains in a desired location in the container, the desired location being adjacent to a wall of the container, which method comprises applying a magnetic field at a location adjacent to a wall of the container opposite the wall adjacent to the desired location, the magnetic field interacting with the diamagnetic liquid to produce a force that repels the diamagnetic liquid away from the magnetic field and toward the wall of the container adjacent to the desired location.

* * * * *